(12) United States Patent
Abe et al.

(10) Patent No.: US 6,549,712 B2
(45) Date of Patent: Apr. 15, 2003

(54) METHOD OF RECOATING AN OPTICAL FIBER

(75) Inventors: Shinichi Abe, Sagamihara (JP); Akihiko Yazaki, Tokyo (JP); John T. Cowher, Leander, TX (US); William V. Dower, Austin, TX (US); Anthony W. Gatica, Cedar Park, TX (US); Jason D. Kordecki, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 65 days.

(21) Appl. No.: 09/852,538

(22) Filed: May 10, 2001

(65) Prior Publication Data

US 2002/0186947 A1 Dec. 12, 2002

(51) Int. Cl.⁷ .................................................. G02B 6/16
(52) U.S. Cl. ............................ 385/123; 385/37; 385/54; 385/124; 385/128; 385/134; 427/51; 427/54
(58) Field of Search ............................ 385/37, 54, 128, 385/124, 134; 427/54

(56) References Cited

U.S. PATENT DOCUMENTS

| | | | |
|---|---|---|---|
| 4,410,561 A | 10/1983 | Hart, Jr. ................... | 427/54.1 |
| 4,434,554 A | 3/1984 | Korbelak ................... | 30/90.8 |
| 4,630,406 A | 12/1986 | Butler ........................ | 51/285 |
| 4,662,307 A | 5/1987 | Amos et al. ............... | 118/50.1 |
| 4,865,411 A | 9/1989 | Darsey et al. ............. | 350/96.21 |
| 4,976,596 A | 12/1990 | Darsey et al. ............. | 425/117 |
| 5,022,735 A | 6/1991 | Dahlgren .................. | 350/96.21 |
| 5,269,206 A | 12/1993 | Yagawa ..................... | 81/9.51 |
| 5,451,294 A | 9/1995 | Kolasinski et al. ....... | 216/7 |
| 5,481,638 A | 1/1996 | Roll et al. ................. | 385/134 |
| 5,567,219 A | 10/1996 | Vacha et al. .............. | 65/432 |
| 5,681,417 A | 10/1997 | Jacobs ....................... | 156/344 |
| 5,684,910 A | 11/1997 | Chapin et al. ............. | 385/128 |
| 5,714,196 A | 2/1998 | Vacha ....................... | 427/154 |
| 5,819,602 A | 10/1998 | Brask et al. .............. | 81/9.51 |
| 5,896,787 A | 4/1999 | DeVincentis .............. | 81/9.51 |
| 5,939,136 A | 8/1999 | Cronk et al. .............. | 427/163.2 |
| 5,964,957 A | 10/1999 | Walraven et al. ......... | 134/26 |
| 5,968,283 A | 10/1999 | Walraven et al. ......... | 134/19 |
| 6,123,801 A | 9/2000 | Miller ....................... | 156/344 |
| 6,310,998 B1 * | 10/2001 | Starodubov ............... | 385/128 |

FOREIGN PATENT DOCUMENTS

JP 8-75930 3/1996 ............ G02B/6/00

* cited by examiner

Primary Examiner—Hemang Sanghavi
Assistant Examiner—Eric K. Wong
(74) Attorney, Agent, or Firm—Alan Ball (57) ABSTRACT

A fiber recoating process and a recoated optical fiber formed by the process that comprises the steps of providing an optical fiber having a coating and cutting a first cut boundary spaced from a secondary cut boundary to mark an internal section of the coating that has opposing sides. Removal of the coating from at least one of the opposing sides provides a pared intervening layer and further forms a first transition region opposite a second transition region. Each of the first transition region and the second transition region has a substantially wedge-shaped contour. Solvent treatment of the pared intervening layer weakens the bond between the coating and the optical fiber between the first cut boundary and the second cut boundary before displacing the coating from the optical fiber to provide the stripped optical fiber. The stripped optical fiber includes a section of optical fiber, the first transition region and the second transition region. After applying recoating material, the stripped optical fiber becomes the recoated optical fiber in which the recoating material covers the section of optical fiber, the first transition region and the second transition region.

12 Claims, 6 Drawing Sheets

METHOD OF RECOATING AN OPTICAL FIBER

FIELD OF THE INVENTION

The invention relates to a process for removing a polymeric covering from the surface of an optical fiber followed by applying a protective recoating composition after modifying the structure of the optical fiber. More particularly the present invention provides a process including physical and chemical steps to remove coating from a portion of a coated optical fiber while shaping transition regions of coating adjacent to the boundaries of a stripped portion of the optical fiber.

BACKGROUND OF THE INVENTION

Interconnection of fiber optic networks requires high precision devices in the form of optical connectors that join optical fibers to peripheral equipment and other optical fibers while maintaining adequate signal strength. In operation an optical connector centers the small fiber so that the light gathering core lies directly over and in alignment with a light transmitting source or another fiber. Sections of optical fiber may also be spliced together using mechanical splicing or fusion splicing techniques.

Special features may be built into selected, relatively short lengths of optical fibers to be spliced into fiber optic networks. An optical fiber Bragg grating represents a light-modifying feature that may be introduced or written into an optical fiber by exposure to ultraviolet light. The ability to write such gratings leads to a variety of devices. Bragg gratings may be applied in telecommunications systems, for example, to control the wavelength of laser light, and to introduce dispersion compensation. Fiber optic applications of fiber Bragg gratings, outside of telecommunications, include spectroscopy and remote sensing.

The process of introducing special features such as Bragg gratings into an optical fiber may include a number of steps requiring handling of relatively short lengths of optical fiber during a series of manufacturing operations. An optical fiber typically requires removal of protective coatings before changing the physical characteristics of the fiber to include a Bragg grating. One manufacturing process requires the removal of protective buffers and coatings to reveal the bare surface of an optical fiber. Several processes are known for removing protective layers, such as buffers and coatings, from the surface of optical fibers. They include mechanical stripping, chemical stripping and thermal stripping.

Mechanical stripping of optical fibers and related coated filaments requires careful positioning of sharp tempered metal blades to expose a bare surface portion of a fiber without cutting or scratching or otherwise physically damaging the fiber surface. Known methods of mechanical stripping relate to cutting blade design and how a coating may be removed from the surface of a fiber. The predominant use of mechanical stripping involves the removal of protective layers from the ends of optical fibers, insulated wires and related filaments, prior to joining the filament ends together. U.S. Pat. No. 4,434,554 describes an optical fiber stripping device including a flat base having a number of fiber receiving channels of suitable depth to ensure only removal of a buffer coating from each fiber, when a blade penetrates the coating. The blade moves parallel to the axis of a fiber or group of fibers using a paring action to remove protective material. Channel size, based upon fiber diameter determines the selection of a flat base to provide a device that strips a fiber end without damaging the fiber itself.

One way to avoid damage to the bare surface of an optical fiber requires the use of blades designed to penetrate the protective buffer or fiber coating without reaching the fiber surface. Suitable blades have a substantially semicircular sharpened edge of a radius slightly larger than the radius of the bare optical fiber. Two opposing blades, penetrating the protective layer around the fiber, interfere with each other before the cutting edges reach the fiber surface. After penetrating a protective layer, close to the end of a fiber, movement of the blades parallel to the fiber axis displaces a section of the layer to provide a bare fiber end untouched by the blades.

Japanese patent JP 875930 uses a mechanical stripping process to remove coating from a section of optical fiber. Initially, an angled cutting blade rotates about two separated points to form notches in the circumference of the buffer coating over the optical fiber. A separate straightedge blade then moves parallel to the fiber axis to remove coating material from between the sharply angled notches.

U.S. Pat. Nos. 4,630,406, 5,269,206, 5,481,638, 5,684,910, and 5,819,602 describe the manufacture and design of blades for cutting insulation from e.g. insulated electrical wires and optical fibers. Successful mechanical stripping using such blades may require additional treatments, including softening the protective layer as in U.S. Pat. No. 5,481,638 requiring a chemical filled chamber first to soften an encapsulating layer then to clean plastic material from the blades after stripping. U.S. Pat. No. 5,684,910 teaches an optical fiber having improved mechanical strippability. The improvement includes the use of a frangible boundary layer between a fiber coating and a buffer to facilitate separation from the bare fiber. Previous teachings include initial blade movement perpendicular to a filament axis, to penetrate a coating, followed by movement parallel to the filament axis to expose bare filament ends by displacement of protective layers.

Chemical stripping may be used as an alternative to mechanical stripping for preparing bare fiber ends. U.S. Pat. Nos. 4,865,411 and 4,976,596 deal with controlled removal of coating, by gradual withdrawal of a coated fiber from a chemical bath, to produce a contoured shallow taper adjacent to the bare glass fiber surface. A fixture, according to U.S. Pat. No. 5,451,294 provides support while dipping the end of a coated optical fiber into a chemical bath to dissolve coating from the end. Organic solvents and related softening agents may be used to remove coatings from optical fibers as described in U.S. Pat. Nos. 5,567,219, 5,681,417, 5,714,196, and 5,896,787. Chemical stripping methods include common problems related to the handling of chemicals especially, when the chemical strippers involve corrosive liquids.

Stripping by rapid heating may be used instead of mechanical or chemical stripping. One example of this process, described in U.S. Pat. No. 6,123,801, uses a hot inert gas to melt buffer coating and blow it from the surface of an optical fiber. The process requires high pressure gas streams and temperatures in the region of 800° C. to strip coating from the fiber. U.S. Pat. No. 5,939,136 describes a process for preparing optical fiber devices including thermal removal of a coating from an optical fiber, preferably performed using a heated gaseous stream. U.S. Pat. Nos. 5,964,957 and 5,968,283 further describe the use of heat to remove coatings from optical fibers.

A reason for removing protective buffers and related coatings from an inner section of optical fibers is the need to change the characteristics of the fiber such as by writing of a refractive index grating, also known as a Bragg grating, in the core of an optical fiber. Refractive index changes occur during exposure of a bare fiber to radiation from an ultraviolet laser or similar exposure device. The majority of protective coatings for optical fibers absorb the fiber modifying radiation. This explains the need to remove the coatings before writing a refractive index grating. Fibers coated to a thickness exceeding 400 μm and those having silicone containing coatings respond poorly to mechanical stripping and chemical stripping as methods for removing optical fiber coatings.

Chemical stripping using hot concentrated sulfuric acid does not always displace optical fiber coatings as expected. Thick, silicone-containing coatings, in particular, may react poorly in the presence of hot sulfuric acid. Some coatings may not dissolve cleanly, or may tend to form gelatinous strands that adhere to the optical fiber leaving discolored, or charred material that is difficult to remove from the surface of a bare fiber. This is particularly undesirable if gel material remains attached to sections of optical fiber from which coating should be stripped. Partially dissolved coatings may also detach from a fiber and contaminate other fibers or the bath. Chemical contamination may also result from acid stripping of silicone-containing coatings.

Problems may also be encountered with mechanical stripping of some coated optical fibers. A thick outer coating is tough and difficult to remove with conventional mechanical stripping devices. A mechanical stripping method cannot normally displace all of the coating from an optical fiber to provide a clean, bare optical fiber surface. For this reason it is conventional to use a combination of mechanical stripping and chemical or thermal stripping to remove the coating from a coated optical fiber to expose a clean bare surface.

An optical fiber including a refractive index grating also has a bare portion, after stripping, that requires application of protective coatings before becoming part of an optical fiber device. The widely accepted method for recoating bare sections of optical fibers involves special coating molds. Methods similar to those used to coat drawn fibers, during their manufacture have also been described.

A recoating mold, described in U.S. Pat. No. 4,410,561, provides a coated optical fiber using a split mold die structure. The size and design of a cavity formed by the closed mold provides space that becomes filled during injection of curable, protective, fluid recoating compositions. It is desirable to avoid entrapment of air inside the mold since this could lead to a defective recoated fiber section. Complete filling of a mold cavity may involve intentional application of pressure. U.S. Pat. No. 5,022,735 uses a screw type plunger to pressurize recoating fluid injected into a conventional recoating mold. Some recoating molds include curing means to provide finished recoated sections of optical fibers. U.S. Pat. No. 4,662,307, for example, uses a split mold including an injection port and UV light port through which light passes to cure recoating compositions. The curing process requires multiple light sources.

Conventional stripping to remove coating from a section of an optical fiber addresses how to remove the coating to obtain a, clean and bare length of optical fiber between spaced-apart boundaries that have bare fiber on one side and original coating or buffer on the other. A coating over an optical fiber may include a primary buffer and a secondary buffer. Short distances on either side of each boundary may be referred to as transition regions of a stripped optical fiber. In most cases, the coating at each boundary is disposed at a sharp angle to a bare fiber. In some cases, e.g. U.S. Pat. Nos. 4,865,411, 4,976,596 and 5,451,294 the transition regions may have a conical shape. However these references use chemical shaping that is time consuming and difficult to control, and may not be appropriate for all fibers.

Transition regions represent points of weakness of a stripped section of a coated fiber, especially when the fiber is a brittle, glass optical fiber. A previously stripped section of fiber may be strengthened somewhat by application of a recoating material that protects and, to a certain extent, provides some support to the fragile glass fiber. However, even a recoated fiber may exhibit weakness in its transition regions, especially when the severed boundaries of the coatings make a sharp angle, e.g. a 90° angle, with the fiber axis. Weakness may appear as cracking or breaking of the recoating material in the transition regions after long term use or accelerated aging that occurs by thermal recycling of recoated fibers, particularly optical fibers. At times there is enough crack propagation to cause the formation of a gap between a recoating material and the original fiber coating. This occurs because of stress concentration within the transition regions and particularly at the boundary between the original coating and the recoating material.

The use of a high Young's modulus resin as the recoating material offers one approach for preventing crack propagation within transition regions of recoated fibers. This solution is not fully effective because resins having a high Young's modulus may adversely impact the performance of a refractive index grating contained by the recoated section of optical fiber, compared to a conventional recoating resin material.

Some fibers with a hard polymer coating material require pre-treatment of the coated fiber to soften the original polymer coating. Pretreatment can adversely affect the rate and yield of recoated fibers.

Each point in the processes, of fiber stripping, modifying, e.g. to introduce a refractive index grating, and recoating, requires care to prevent damaging the fragile optical fiber. Damage to optical fibers may occur by physical contact or exposure to tensile, torsional, twisting, and bending stresses. Excessive bending can change the optical characteristics of a fiber. Failure to meet required optical characteristics leads to rejection of an optical device and increases the expense of device manufacture. A need exists for improved means for stripping and recoating processes to reduce incidence of damage, thereby reducing the cost and increasing the yield of optical fiber devices. The resulting, recoated fiber should be highly reliable.

SUMMARY OF THE INVENTION

The present invention provides a process for preparing and stripping a central portion of a coated fiber to provide a shaped transition region adjacent to the bare surface of the stripped fiber. Thereafter, the contours of the shaped transition region promote improved bonding with recoating compositions later applied to cover transition regions and the stripped central portion of a fiber. A preferred method according to the present invention includes the steps of boundary cutting, transition region shaping, solvent treatment and coating displacement.

Coated fibers suitable for use with the present invention include elongate filaments having a central core overcoated with at least one layer of protective material. Examples of such filaments include insulated wires and particularly optical fibers. A variety of devices use optical fibers that require structural modification to include one or more in-line optical waveguide refractive index gratings, also known as Bragg gratings. At least one Bragg grating may be formed in at least a portion of the length of an optical fiber. Formation of an optical fiber Bragg grating typically requires a series of operations including mechanical stripping of protective coatings, and chemical stripping to expose the fiber by removing residual material down to the clean optical fiber surface. The writing of Bragg gratings into optical fibers is well known using patterns of ultraviolet radiation to alter optical fiber index of refraction characteristics. An optical fiber that contains a Bragg grating in a stripped section is susceptible to damage by chemical attack or by physical contact and exposure to tensile, torsional, twisting, and bending stresses. Excessive bending can change the optical characteristics of a fiber. Failure to meet required optical characteristics leads to rejection of an optical device. Recoating the previously stripped section of optical fiber reduces susceptibility to damage. Testing by thermal recycling and visual inspection confirms attainment of performance requirements desired of a recoated optical fiber Bragg grating.

A process according to the present invention for stripping coating from a filament, particularly an optical fiber, down to a cleaned fiber surface begins by establishing the boundaries of a section of fiber for removal of coating. Formation of cut boundaries requires radial cutting through most of or all of the thicker, outer, secondary buffer using one or more blades, preferably a pair of opposed blades operating at right angles to the axis of the fiber. Incisions through the secondary buffer may extend into but not through the primary buffer that is closest to the core structure of the fiber. Equipment used to form cut boundaries preferably includes suitably positioned stops to prevent incisions from reaching too far into the coating covering the bare fiber. The cut boundaries represent a discontinuity in the secondary buffer over the fiber. Preferably, the equipment used to form cut boundaries includes a pair of blades that simultaneously produce incisions at each of the cut boundaries. During this process the pairs of blades have a separation corresponding to the length of the section of fiber to be stripped of original coating material. The distance separating the pairs of blades is preferably about 2.54 cm (1 inch). Depending on the nature of the process steps following optical fiber stripping, the length of coating stripped from a coated optical fiber may range from about 1 cm to about 4.5 cms, preferably between about 1.5 cms and 3.6 cms.

After formation of the cut boundaries and withdrawal of the blades from the incisions, an increased separation of the blades moves them outside the locations of the cut boundaries. Optionally the coated optical fiber may be transferred to a piece of equipment designed for shaping transition regions from points outside the cut boundaries. The shaping process may use either a single skiving blade or a pair of angled, straight-edged skiving blades or a device to abrade the transition region to a desired shape. Using skiving blades at a fixed blade angle, a single pass or multiple passes along the fiber section introduces opposing shoulders angling towards flattened steps on one side or opposing sides of the fiber. The latter, preferred case corresponds to the placement of skiving blades above and below the fiber or in a similar opposing relationship. The flattened steps lie outside of the cut boundaries to form parts of transition regions after the removal of coating from between the cut boundaries. It will be appreciated that removal of coating may involve one or more sections around the circumference of a coated optical fiber, depending upon the desired shape of the transition region. After shaping both sides of the coating, the thickness remaining on either side of the optical fiber is the same between the cut boundaries as it is between the flattened step of each transition region. Also, between the cut boundaries the depth of penetration into the secondary buffer exposes a length of primary buffer for at least the distance between the cut boundaries. Upon completion of the shaping process, preferably the secondary buffer is discontinuous at each of the cut boundaries as described previously. In addition, exposure of the primary buffer causes a gap on opposing sides of the secondary buffer. Removal of the underlying primary buffer should release the secondary buffer from around the section of fiber to be stripped.

The stripping process according to the present invention applies particularly to coated fibers including solvent swellable primary buffers. After completion of the shaping process, immersion of the affected fiber section in a suitable solvent causes swelling of the primary buffer or coating preferably between the cut boundaries. Swelling of the primary buffer also weakens the connection between the secondary buffer and the fiber. In this condition the secondary buffer may be relatively easily displaced from the surface of the fiber, either by picking or otherwise gently dislodging the coating from the fiber. One method for gently dislodging insoluble coating from a fiber involves the use of at least a pair of resilient wiping blades or pads drawn between one cut boundary and the other for effective removal of residual coating loosened by swelling of the primary buffer. Removal of the loosened secondary buffer preferably uses a deformable material that displaces secondary buffer without damaging the fiber. Particularly tenacious coatings may require treatment with acid as a final cleaning step.

After removing its protective coating and applying tension to the stripped section of an optical fiber, the Bragg grating writing process proceeds preferably while observing a spectrum analyzer display of the wavelength envelope produced by the writing process. This provides feedback of the quality of a grating at the time of writing and represents a convenient decision point for acceptance or rejection a fiber Bragg grating as it is written.

Application of recoating material to protect a Bragg grating formed in an optical fiber represents the final step according to the recoating process of the present invention. A final check of the resulting product determines if it passes visual inspection requirements and proof testing to measure tensile strength. A stripped optical fiber containing a Bragg grating may be recoated using a conventional split recoating mold that has two sections each with a semicircular groove formed in its surface. After closing the mold a cylindrical cavity forms around the fiber portion that needs recoating. Fluid injected through an opening in the mold surrounds the stripped fiber portion before curing to provide the recoated optical fiber. Commercially available recoating compositions may be used for this purpose.

More particularly the present invention provides a process for recoating a stripped optical fiber comprising the steps of, providing an optical fiber having a coating and cutting a first cut boundary spaced from a secondary cut boundary to mark an internal section of the coating, the internal section having opposing sides. Removal of the coating from at least one of the opposing sides provides a pared intervening layer and further forms a first transition region opposite a second transition region. Each of the first transition region and the second transition region has a substantially wedge-shaped contour. Solvent treatment of the pared intervening layer weakens the bond between the coating and the optical fiber between the first cut boundary and the second cut boundary before displacement of the coating from the optical fiber to provide the stripped optical fiber. The stripped optical fiber includes a bare section of optical fiber, the first transition region and the second transition region. After applying recoating material, the stripped optical fiber becomes the recoated optical fiber in which the recoating material covers the bare section of optical fiber, the first transition region and the second transition region.

The invention further includes a recoated optical fiber comprising a first transition region having a substantially wedge-shaped contour adjacent to a first cut boundary. A second transition region also having a substantially wedge-shaped contour lies opposite the first transition region, and adjacent to a second cut boundary. The recoated optical fiber further includes a section of optical fiber, between the first cut boundary and the second cut boundary, and a recoating material having a bond to the first transition region, the section of optical fiber and the second transition region.

Definitions

The terms "bare fiber," or "bare fiber portion," or "stripped fiber," or phrases relating to such terms refer herein to the portion of an optical fiber from which protective coating has been removed to expose the silica surface of the fiber.

The terms "buffer" or "primary buffer" or "primary coating" refer herein to a polymer or resin layer next to a bare fiber.

A "secondary coating" or "secondary buffer" is used herein to describe a polymer or resin layer next to a buffer or primary buffer.

The term "resin" as used herein is a general term describing polymer coverings for filaments particularly optical fibers. Materials used for previously defined buffers and coatings fall within the general term of resin.

The term "filament" herein refers to a fiber structure, preferably a "silica filament." An optical fiber is a preferred form of filament according to the present invention.

A "transition region" describes the preferably quasi-wedge shape of the portion of buffer layers closest to a bare fiber portion after subjecting a coated optical fiber to stripping according to the present invention.

The term "cut boundary" refers to an incision made in the circumference of a coated optical fiber to substantially penetrate a secondary buffer coating with minimal penetration of a primary buffer coating. A separation between a first cut boundary and a second cut boundary represents the section of coating to be stripped from the surface of the bare fiber.

The term "pared intervening layer" is used herein to describe a structure formed by removing coating material from around an optical fiber. In this case paring includes removal of material using either sharpened blades or some form of abrasive.

The present invention has been developed to provide a process and equipment for conveniently handling a filament in the form of an optical fiber during multiple processing operations that may be at least partially automated as a further benefit to the user. These enhancements and benefits are described in greater detail hereinbelow with respect to the several aspects and alternative embodiments of the present invention.

BRIEF DESCRIPTION OF THE DRAWINGS

Notwithstanding any other forms, which may fall within the scope or the present invention, preferred forms of the invention will now be described, by way of example only, with reference to the accompanying drawings in which.

DETAILED DESCRIPTION OF THE PREFERRED EMBODIMENT

Figure 1:
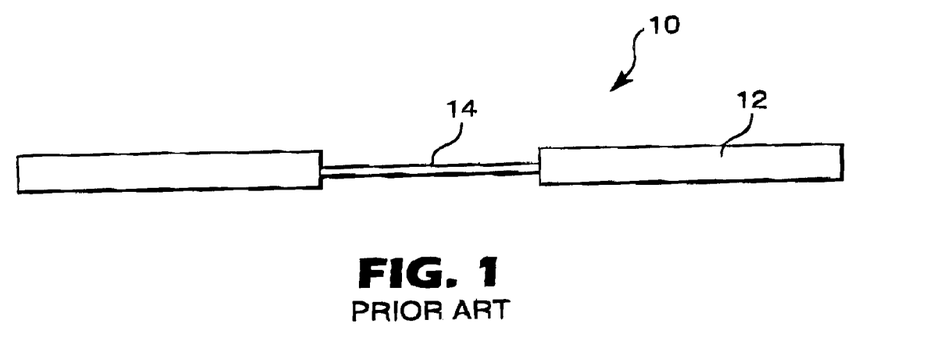
FIG. 1 shows a side elevation of an optical fiber having protective coating stripped from a central portion using a prior art process.

Referring now to the drawings wherein like numbers represent like parts throughout the several views, FIG. 1 shows a side elevation of a prior art coated optical fiber 10 having protective coating 12 removed to reveal the stripped surface of a section 14 of optical fiber 10. There is a relatively sharp angle, usually about 90°, between the original fiber coating 12 and the surface of the stripped section 14 of the optical fiber.

Removal of coating 12 from an optical fiber 10 typically precedes the modification of the physical structure of a glass fiber. One modification causes changes in the refractive index of the glass to provide a periodic refractive index grating, or Bragg grating, in a portion of the stripped section 14 of optical fiber 10. Refractive index change occurs in response to a pattern of ultraviolet radiation directed towards the uncoated optical fiber 14. Radiation, which is effective for writing the Bragg grating, either does not penetrate conventional optical fiber coatings, or will damage the coatings. This accounts for the removal of such coatings to allow formation of a Bragg grating in an optical fiber. Some coatings are known as write-through coatings that allow passage of ultraviolet radiation to change the refractive index of the glass of an optical fiber. However, such coatings have other deficiencies that prevent their use in a majority of cases.

Figure 2:
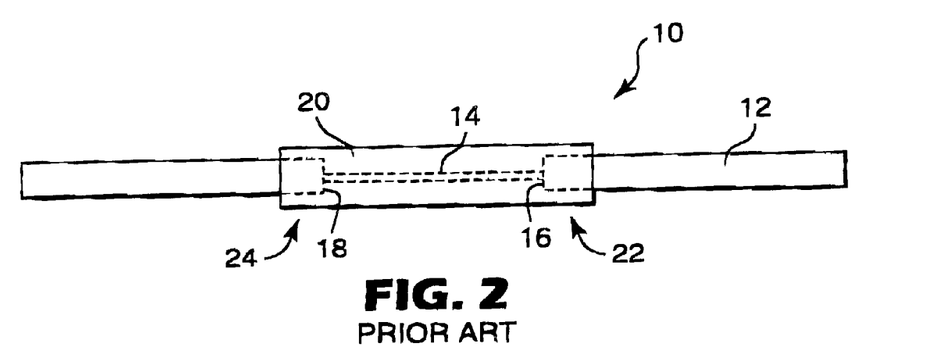
FIG. 2 is a side elevation showing a prior art recoated optical fiber.

FIG. 2 illustrates the structure that results from recoating a stripped section 14 of a coated optical fiber 10. The overcoated section 14 includes a first junction 16 and a second junction 18 of the original optical fiber coating 12 and the recoating material 20, at each end of the previously stripped section 14 of optical fiber 10. There is also a first transition 22 and a second transition 24 formed by overlap of the recoating material 20 on the original coating 12 adjacent to each junction 16, 18.

Figure 3:
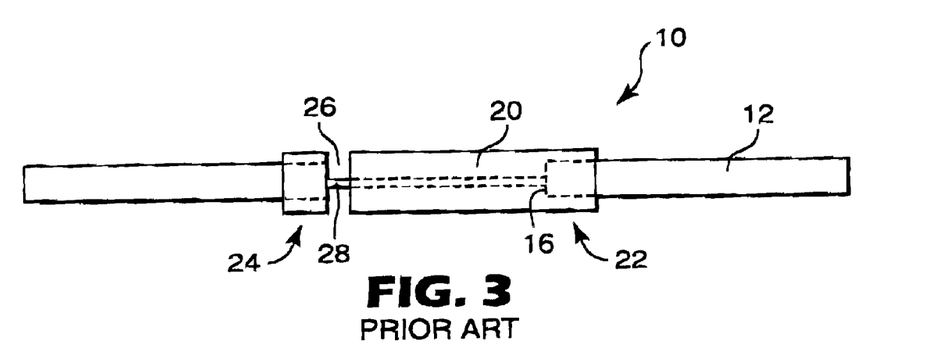
FIG. 3 is a side elevation of a prior art recoated fiber showing failure of the recoated section between the original fiber coating and the recoating material.

FIG. 3 shows the result of failure of a recoated section of an optical fiber 10. Failure may occur by adverse application of force including impact, tension or torsional forces to a recoated optical fiber. Application of force causes cracking adjacent to a junction 16, 18 of the recoated fiber. Severe cracking leads to separation of the recoating material 20, forming a gap 26 at a junction 16, 18. The gap permits entry of materials, both liquid and solid, that cause damage to a glass fiber. A coating gap 26 further weakens the optical fiber 10 structure by removing support from the bare fiber 28 in the region of the gap 26.

Figure 4:
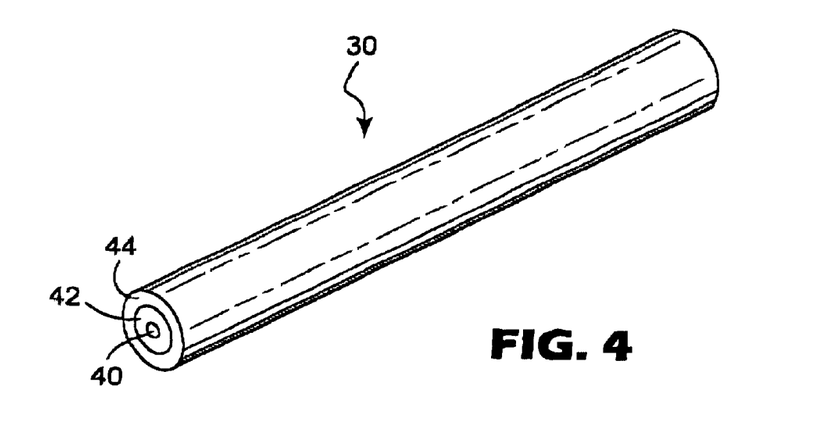
FIG. 4 is a perspective view of an optical fiber including protective primary and secondary buffers.

FIG. 4 shows a perspective view of a conventional, coated optical fiber 30 including a bare optical fiber 40 overcoated with a primary buffer 42 and a secondary buffer 44. Typically resins used for the primary buffer 42 and secondary buffer 44 are crosslinked resins. A preferred optical fiber according to the present invention has a primary buffer 42 of a crosslinked acrylate resin that is somewhat softer and less durable than the crosslinked resin used for the secondary buffer 44. The latter may contain low surface energy materials, such as silicone species, that tend to impede adhesive bond formation during optical fiber recoating.

Silicone materials are known for use in secondary buffers 44. Application of recoating material to such buffers, using the teaching of prior art, produces unsatisfactory recoated optical fibers that include sharp junctions and tend to fail as indicated in FIG. 3. This problem may be significantly removed using a process for preparing a stripped section of an optical fiber according to the present invention.

Figure 5:
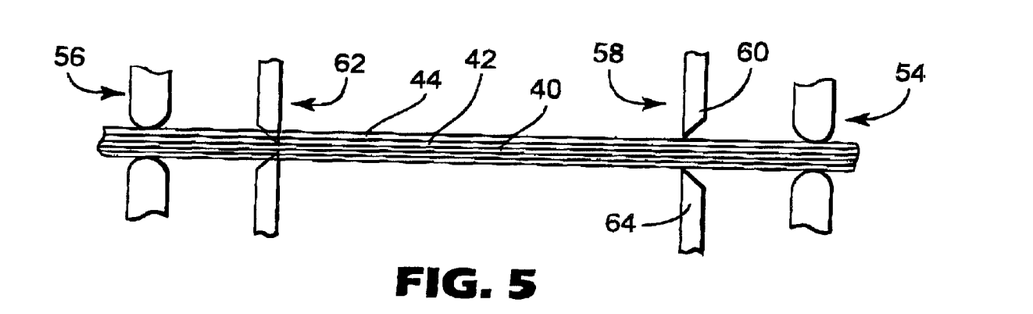
FIG. 5 is a cross section providing a diagrammatic representation of a cutting apparatus used to make an incision in a coating around an optical fiber.
Figure 6:
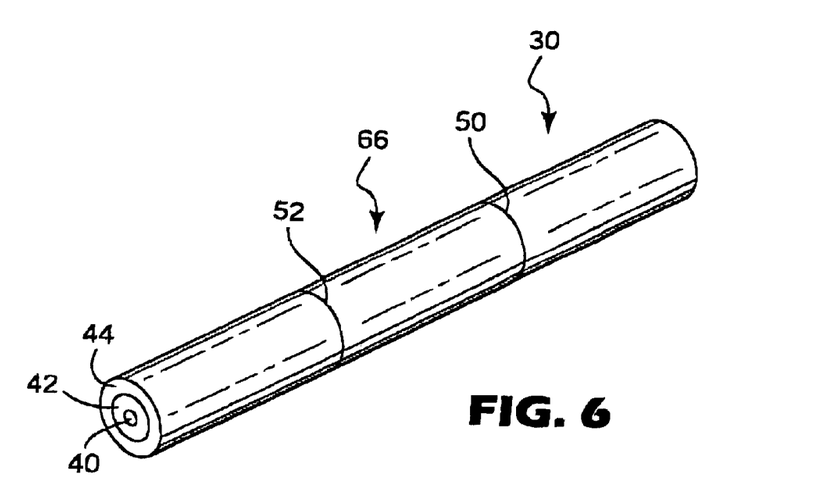
FIG. 6 is a perspective view of a coated optical fiber showing cut boundaries in a central section of the optical fiber.

FIG. 5 provides a diagrammatic representation of a cutting apparatus 48 for forming a first cut boundary 50 and a second cut boundary 52 (see FIG. 6). These boundaries 50,52 are the demarcation points for a section of optical fiber that will be stripped of primary 42 and secondary 44 buffers to expose the surface of a bare fiber 40. The apparatus controls a pair of blades each having a semicircular cutting edge (not shown) that cuts into the secondary buffer coating 44 around the circumference of the coating 44. For this purpose, a first clamp 54 holds one end of a portion of a coated optical fiber 30. The coated optical fiber 30 comprises a bare fiber 40 overcoated with one or more protective resin layers 42, 44. A second clamp 56 holds the other end of the portion of the coated optical fiber 30. Both clamps 54, 56 are conventional optical fiber clamps that grip the outer surface of a relatively hard secondary buffer coating 44. This prevents damage to the underlying optical fiber 40. Preferably the clamps 54, 56 include frictional gripping surfaces such as rubber or elastomer gripping surfaces that resist fiber movement during mechanical stripping.

The immobilized, coated optical fiber 30 exists under slight tension, preferably of about 50 g. Typical separation between the first clamp 54 and the second clamp 56 is from about 50.0 mm (2.0 inches) to about 100 mm (4.0 inches) preferably 75.0 mm (3.0 inches) to about 90 mm (3.5 inches). Having restrained the optical fiber 30 between the pair of clamps 54, 56, at least one set of cutting blades 58 may be placed abutting the coated optical fiber 30 with the sharp edge of an upper cutting blade 60 resting against the surface of the secondary buffer 44. The desired position is shown by the location of a first set of cutting blades 58 relative to the clamped, coated optical fiber 30. A second set of cutting blades 62 is shown in FIG. 5 in a position, adopted by the cutting blades 62, after penetration of the secondary buffer 44 of an optical fiber 30. Each set of cutting blades 58,62 includes an upper blade 60 and a lower blade 64. The sharp edge of each cutting blade 60, 64 includes at least one essentially semicircular notch having a radius in common with a primary buffer coat 42 applied to an bare optical fiber 40. During scoring of the coated optical fiber 30 to form an incision in the secondary buffer 44, the upper 60 and lower 64 blades move inwards, as shown for the second set of cutting blades 62. Movement of the blades 60, 64 produce a peripheral incision at least to the depth of the secondary buffer 44. When the cutting operation has been completed at one end of the coated optical fiber portion, the opposite end of the fiber 30 may be scored by initiation of the cutting action of the first set of cutting blades 58. This produces a second incision in the secondary buffer 44, as illustrated in FIG. 6. The incisions produce cut boundaries 50,52 representing a section 66 of optical fiber 30 from which coating 42,44 will be removed to reveal the surface of bare optical fiber 40.

Figure 7:
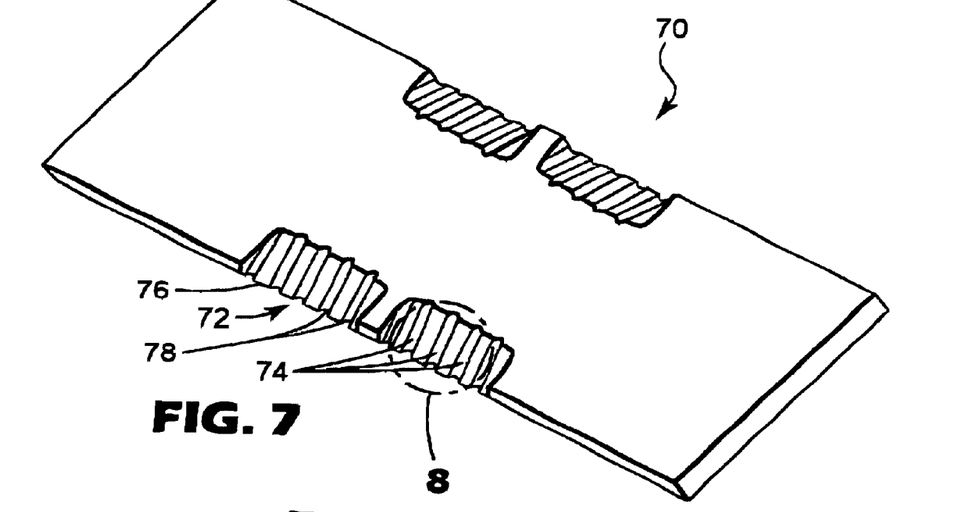
FIG. 7 is a perspective view showing blades suitable for use with the equipment of FIG. 5.

FIG. 7 shows the design of blade components used for cutting the secondary buffer coating 44. The detailed features of the blade 70 of FIG. 7 may also be included in both sets of cutting blades 58, 62. It will be appreciated that the same blade 70 may be used to strip single or multiple fibers 30 depending on the design of the cutting apparatus 48 and the number of fibers 30 presented for cutting.

Figure 8:
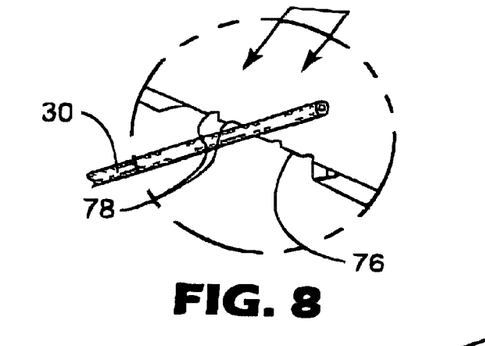
FIG. 8 provides a detail view showing the relative positioning of an optical fiber and a blade used to make a cut boundary in the secondary buffer around the optical fiber.
Figure 9:
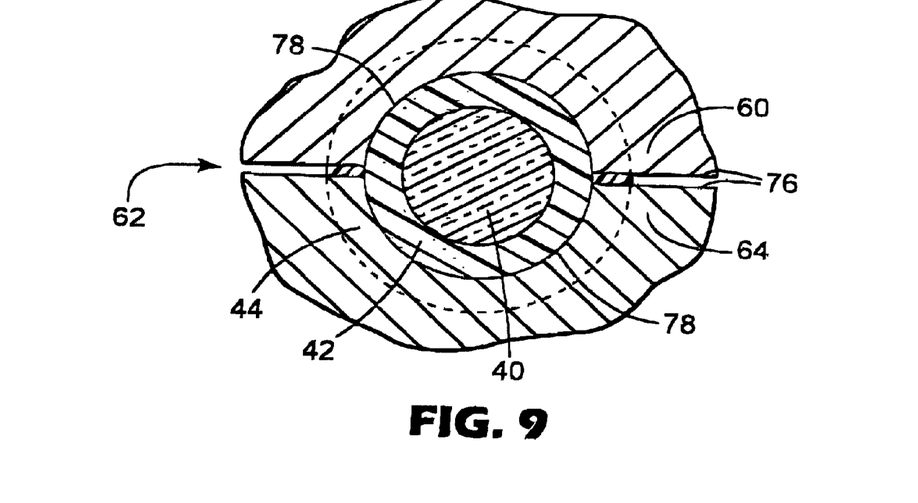
FIG. 9 is a cross sectional view showing the position of cutting blades after forming a cut boundary in the coating around an optical fiber.

A stripping blade 70 according to the present invention includes at least one bevel 72 as a portion of the blade 70 that includes several channels 74 machined into its surface. The channels 74 open to an edge 76 of a bevel 72 as sharpened notches 78 having approximately circular cross-section when viewed from the side opposite the bevel 72. A detail view, shown in FIG. 8 includes a coated optical fiber 30 to indicate its preferred position before penetration of the secondary buffer 44 by a sharpened notch 78 of a cutting blade 70. The knife-edge of a sharpened notch 78 preferably reaches only through the thickness of the secondary buffer 44 without substantially cutting into the primary buffer 42. When used for cutting into the coating over an optical fiber 30, the notches 78 cut a circular path around an optical fiber 40 as shown in FIG. 9. This relates to the position of the second set of cutting blades 62 as shown in FIG. 5. The sharpened notches 78 of the upper blade 60 and lower blade 64 have penetrated the secondary buffer coating 44 to approximately its total thickness preferably without significant penetration into the surface of the primary buffer coating 42. Contact between the advancing edges 76 of the blades 60, 64 prevents further advancement of either blade 60, 64.

The process of forming cut boundaries 50, 52 in an optical fiber 30 may be conducted manually or as an automated or semi-automated process using equipment suitably designed for the task. A cutting apparatus 48 may be designed to process multiple fibers 30 in a single operation.

Figure 10:
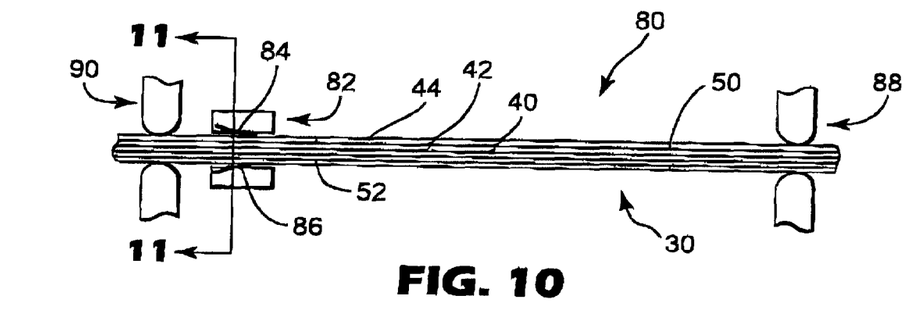
FIG. 10 provides a cross sectional view in diagrammatic form to show an optical fiber shaving apparatus used to remove outer layers of coating from an optical fiber.

FIG. 10 provides a diagrammatic representation of an optical fiber shaving apparatus 80 showing a clamped, coated optical fiber 30 from which a surface layer of secondary buffer 44 will be removed to expose a thin strip of primary buffer 42. A shaving implement 82 mounted on the shaving apparatus 80 applies a first sharpened straightedge 84 to one side of a coated optical fiber 30 and a second sharpened straightedge 86 to the opposite side of the coated optical fiber 30.

Preparation to remove coating from a coated optical fiber 30 requires that the fiber 30 be suspended under slight tension between a pair of conventional clamping jaws for optical fibers. Such clamping jaws, referred to herein as grippers 88, 90, hold an optical fiber between a V-groove and a material that prevents the fiber from moving during removal of coating. The points at which the grippers 88,90 hold the optical fiber 30 lie outside each of the cut boundaries 50, 52 that were formed with the cutting apparatus (see FIG. 5). After isolating a section of optical fiber 30 between the grippers 88, 90, positioning of the shaving implement 82 places an angled, sharpened straightedge 84, 86 on opposing sides of the coated fiber. The angled, sharpened straightedges 84,86 bite into the surface of the secondary buffer 44 over the coated optical fiber 30. From a position between a cut boundary 52 and gripper 90, movement of the shaving implement 82, towards the other gripper, 88 causes the straightedges 84, 86 to cut into the secondary buffer 44. During its travel the shaving implement 82 removes a sliver of buffer material 44 that begins outside the first cut boundary 50 and ends beyond the second cut boundary 52. Adjustment of the straightedges 84, 86 permits removal of a portion of the secondary buffer 44 without allowing penetration through the softer primary buffer 42, and this prevents contact between the glass and the straightedges 84, 86. Removal of a sliver of buffer may also be referred to herein as paring to provide a pared intervening layer.

Figure 11:
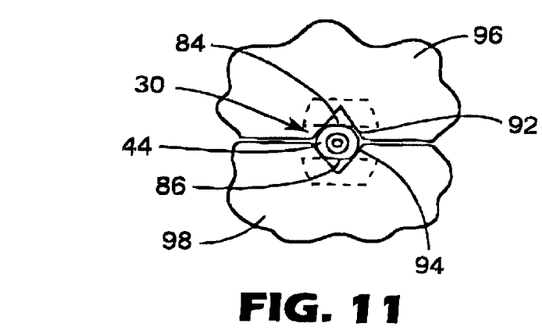
FIG. 11 shows a cross sectional view of straightedge blades used to remove coating from a section of optical fiber.

FIG. 11 provides a detailed cross sectional view, through line 11—11 of FIG. 10, showing the positioning of the coated optical fiber 30 compared to the angled, sharpened straightedges 84,86. The first sharpened straightedge 84 protrudes from a first V-groove 92 and the second sharpened straightedge 86 protrudes from a second V-groove 94. Each V-groove 92, 94 may be formed in a suitable faceplate 96, 98 to be positioned on either side of a coated optical fiber 30. Separate structures may hold each faceplate 96, 98 in the proximity of the coated fiber 30. Alternatively the faceplates 96, 98 may be hinged together as a two part structure that may closed over the optical fiber 30 for precise positioning of the straightedges 84, 86 prior to the shaving operation. The V-grooves 92, 94, when closed together, provide a guide channel to maintain the correct relationship between the angled straightedges 84, 86 and the optical fiber 30 during the shaving or skiving process that strips the sliver of secondary buffer 44 from the fiber 30. A stripped or shaved fiber 30, illustrated in FIG. 12, includes a first transition region 100 outside of the first cut boundary 50 and a second transition region 102 outside of the second cut boundary 52. Each transition region has a shoulder 104, 106 narrowing to a flattened step portion 108, 110.

Figure 13:
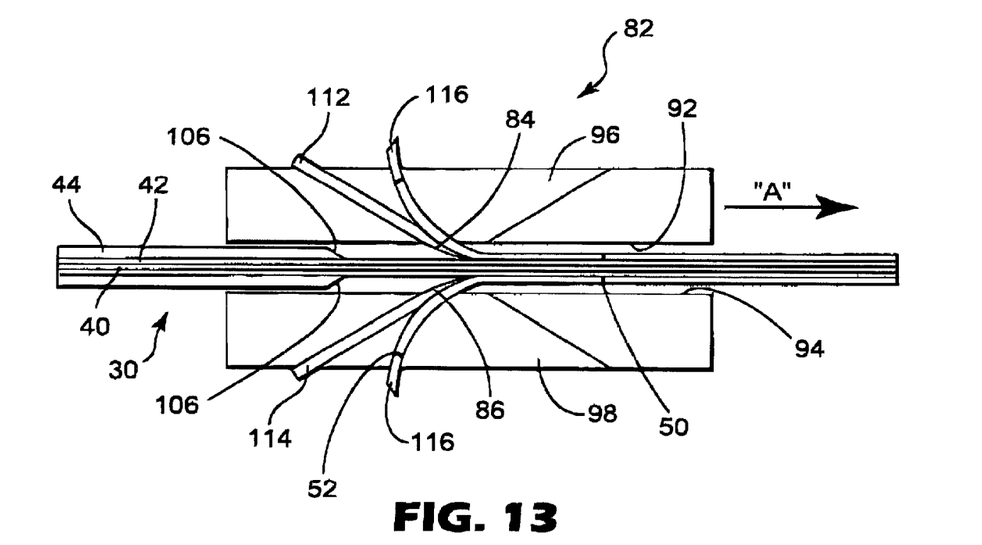
FIG. 13 provides a diagrammatic representation of a cross sectional view of a cutting implement used to remove coating from opposing sides of an optical fiber.

FIG. 13 is a detailed cross sectional view of a shaving implement 82 according to the present invention showing a coated optical fiber 30 that has been partially shaved to remove a thin layer or sliver of secondary buffer 44 from the optical fiber 30. Angled blades 112, 114 include a first, razor-sharp straightedge 84 that shaves secondary buffer 44 from one side of the coated optical fiber 30 while a second, razor-sharp straightedge 86 performs the same function on the opposite side of the optical fiber 30. The blades 112, 114 approach the axis of the optical fiber at a shallow angle from about 2° to about 20° preferably about 5°. Entry of the straightedges 84, 86 into the secondary buffer 44 at such a shallow angle limits the thickness of the sliver 116 shaved from the optical fiber 30. The design of each of the faceplates 96, 98 includes an opening for separation and removal of the growing sliver 116 on either side of the fiber 30. During the shaving process, the straightedges 84, 86 do not cut all the way through the secondary 44 and primary 42 buffers. This prevents any direct contact between the sharpened straightedges 84, 86 and the surface of the bare optical fiber 40. The surface of a bare optical fiber 40 could be scratched if such contact occurred. Scratches on the surface of a bare optical fiber may adversely affect its optical performance.

Initiation of movement of the shaving implement 82, in the direction of the arrow "A", causes the straightedges 84, 86 above and below the optical fiber 30 to cut into the secondary buffer 44 to the depth at which the razor-sharp blades 112, 114 extend into the V-grooves 92, 94. The positioning of the blades 112, 114 determines the shape and thickness of the sliver 116 raised from the surface of the coated fiber 30. As the blades 112, 114 move parallel to the coated fiber 30 they initially carve a shoulder 106 on one side of the fiber 30 and another shoulder 104 on the other. After penetration of the secondary buffer 44 the straightedges 84, 86 skive a layer 116 of substantially consistent thickness until the shaving implement 82 reaches a stop (not shown) after passing the cut boundary 50. Withdrawal of the faceplates 96, 98 from the optical fiber 30 reveals a shaved fiber that has a sliver 116 on either side of the coated fiber 30, connected to the point where movement of the blades 112, 114 ceased after contact with the stop. Disconnection of each sliver 116 produces the transition region 100 that includes the shoulder 104 and the flattened step 108, near the cut boundary 50, as shown more clearly in FIG. 12. As illustrated, the first shoulder 104 has similar contours to the second shoulder 106 even though the shoulders 104, 106 were formed in different ways.

Figure 12:
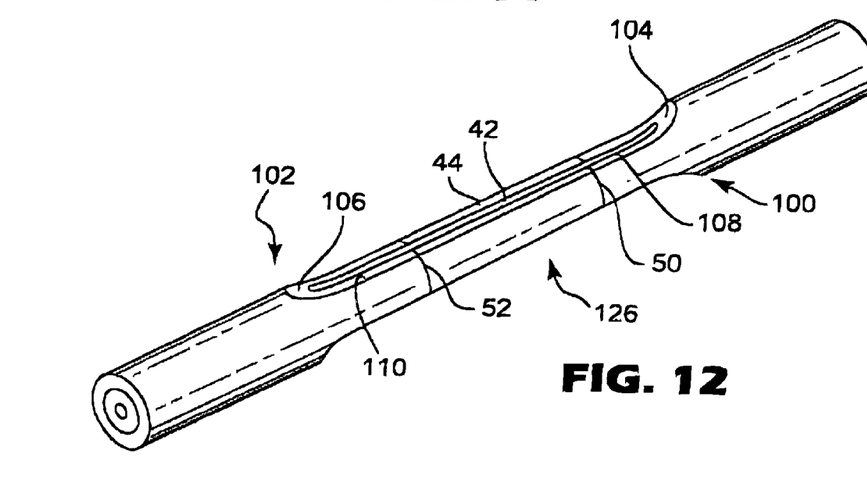
FIG. 12 is a perspective view of a section of optical fiber produced using the equipment illustrated in FIG. 10.

An alternate process according to the present invention uses abrasive shaping to produce a shaped section, also referred to herein as a pared intervening layer of optical fiber 30 having a similar appearance to the shaved optical fiber 126 shown in FIG. 12. The abrasive process may use any of a variety of forms of abrasive products such as abrasive papers, or abrasive shaping tools or the like. Transition regions formed by abrasive shaping, referred to herein as curved wedges, include shallower stepped portions.

In the shaving process described according to FIG. 13 of the present invention the removal of secondary buffer 44 preferably exposes a small amount of the primary buffer 42 between the first shoulder 104 and the second shoulder 106. The primary buffer 42 comprises a polymer layer, preferably an acrylate polymer, sufficiently crosslinked to be insoluble in common solvents such as acetone and methyl ethyl ketone and the like. Although insoluble in such solvents, the primary buffer 42 absorbs them. As it absorbs solvent, the primary buffer 42 swells. The swollen buffer 42 adheres less to the bare optical fiber 40. This allows relatively easy displacement of the primary buffer 42 and any remaining secondary buffer 44 from the bare surface of the optical fiber 40.

The process of swelling buffer coatings using organic solvents is referred to herein as chemical stripping. Chemical stripping is known for removing solvent-soluble or swellable coatings, such as primary and secondary buffers, to reveal a clean surface of an optical fiber. The process usually involves submerging a section of fiber to be stripped beneath the surface of solvent in a suitable container. Soaking time for a swellable coating according to the present invention is usually about 10 seconds to about 60 seconds, preferably about 15 seconds, for a solvent to penetrate the swellable polymer for easy separation from a bare optical fiber 40. Soaking in solvents such as acetone, methyl ethyl ketone and the like for about 15 seconds to about 30 seconds followed by rubbing against the swollen coating effectively removes the coating without significantly damaging the fiber. Solvent usage is preferred, therefore, for disrupting the bond between a protective coating and the surface of a bare optical fiber 40.

Figure 14:
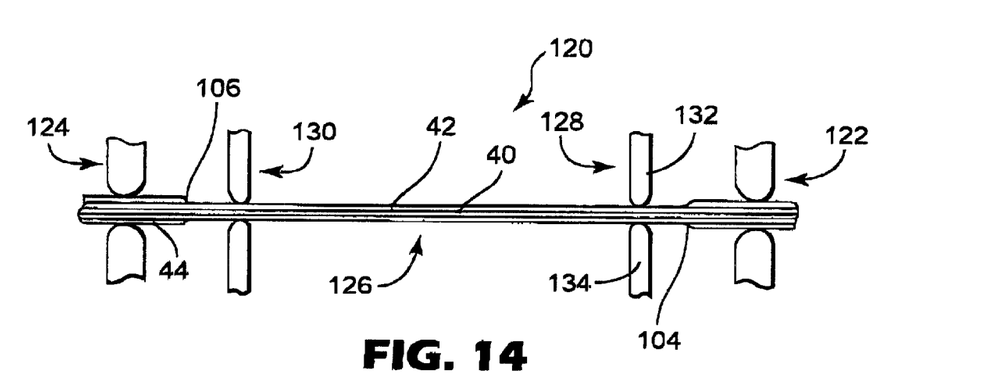
FIG. 14 is a cross sectional view showing a diagrammatic representation of a material displacement apparatus used to expose the surface of a bare optical fiber.
Figure 15:
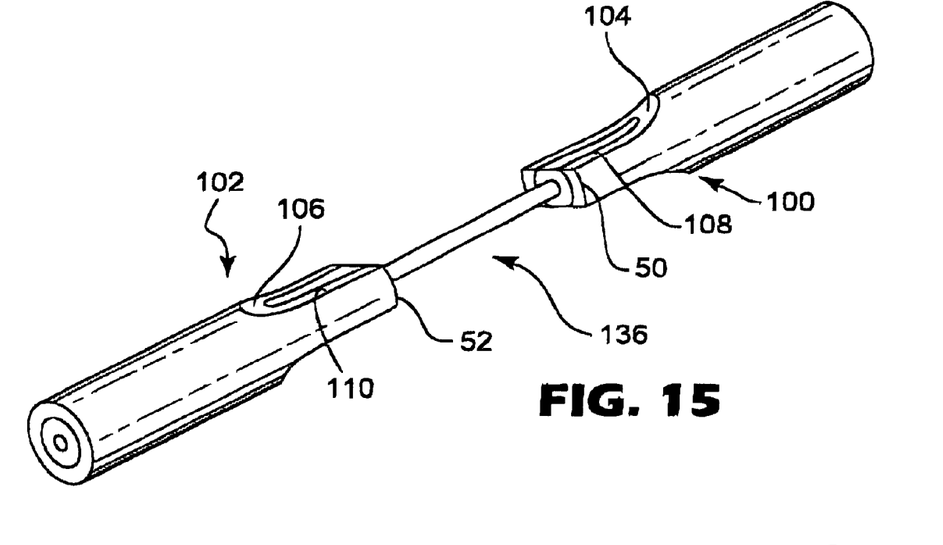
FIG. 15 is a perspective view showing a stripped section of optical fiber that was produced using the equipment of FIG. 14.

FIG. 14 is a cross section showing a coating displacement apparatus 120 according to the present invention. This apparatus 120 uses a first pinch grip 122 and a second pinch grip 124 to hold a shaved optical fiber 126 outside the shoulders 104, 106 at either end of the shaved section of the optical fiber 126. The primary buffer 42 of the shaved optical fiber 126 remains solvent swollen following placement in the coating displacement apparatus 120 immediately after removal from the solvent bath. In this condition, relatively light rubbing against the primary buffer 42 and the remaining secondary buffer dislodges the buffer materials 42, 44 from the surface of the bare optical fiber 40. It will be appreciated that a variety of ways exist to remove the buffer materials 42, 44 without constructing a particular piece of equipment for this task. A preferred method, according to the present invention, uses a first pair of resilient pads 128 and a second pair of resilient pads 130. Each pair of resilient pads 128, 130 includes an upper pad 132 and a lower pad 134. In operation, for displacing solvent swollen polymer from around an optical fiber 40, the upper pad 132 and lower pad 134 of each pair of resilient pads 128, 130 is adapted to move towards the swollen buffers, applying slight pressure when contact is made. A stop suitably positioned on the displacement apparatus 120 may be used to control the amount of pressure applied to the swollen buffers. From an initial position corresponding to the cut boundaries 50, 52 (not shown in FIG. 16) the pairs of resilient pads 120, 130 move towards each other while still pressing against the swollen buffer coating 42, 44. Movement may be repeated with oscillation of the resilient pads between the cut boundaries 50, 52 and the center of the shaved optical fiber 126. Also the angle between the resilient pads 128, 130 and the optical fiber 30 may be adjusted for optimum removal of swollen polymer. Suitable resilient pad materials include rubber and similar elastomeric solids. Pad shape may include planar, rounded and blade shaped surfaces for contact with swollen buffers. Frictional forces between the pads 132, 134 and the swollen polymer material tear the buffers 42, 44 from the surface of the bare fiber 40 leaving a surface that is sufficiently clean to allow ultraviolet radiation to enter the optical fiber 40. This facilitates the process of changing the refractive index characteristics of an optical fiber 40 to introduce a Bragg grating into its structure. After displacement of swollen polymer coating, the shaved section of the optical fiber 126 becomes a stripped section of optical fiber 136 as shown in FIG. 15. The stripped section of fiber 136 is a section of bare optical fiber 40 between the first flattened step 108 and the second flattened step 110. As required to remove any coating residue, the stripped section of fiber 136 may be further cleaned by a final solvent soak or by wiping with a dry or solvent filled cloth. This final wipe is normally unnecessary using the optical fiber stripping process according to the present invention.

FIG. 15 shows flattened steps 108, 110 having a substantially rectangular cross section. It will be appreciated that repeating the shaving process a second time after rotating an optical fiber 90° about its longitudinal axis will produce flattened steps having essentially square cross section. This provides an alternative embodiment for a transition region according to the present invention.

As indicated previously, the purpose of stripping a coated optical fiber 30 is to place it in a condition for forming a periodic refractive index grating, or Bragg grating, in the core of the optical fiber. Methods of forming optical fiber Bragg gratings are known and provide suitable means for modifying stripped sections of optical fiber 136 produced according to the present invention. The purpose of shaping transition regions 100, 102 of optical fibers herein is to improve the bond between a recoating composition and these transition regions 100, 102 after writing a Bragg grating into the optical fiber.

Figure 16:
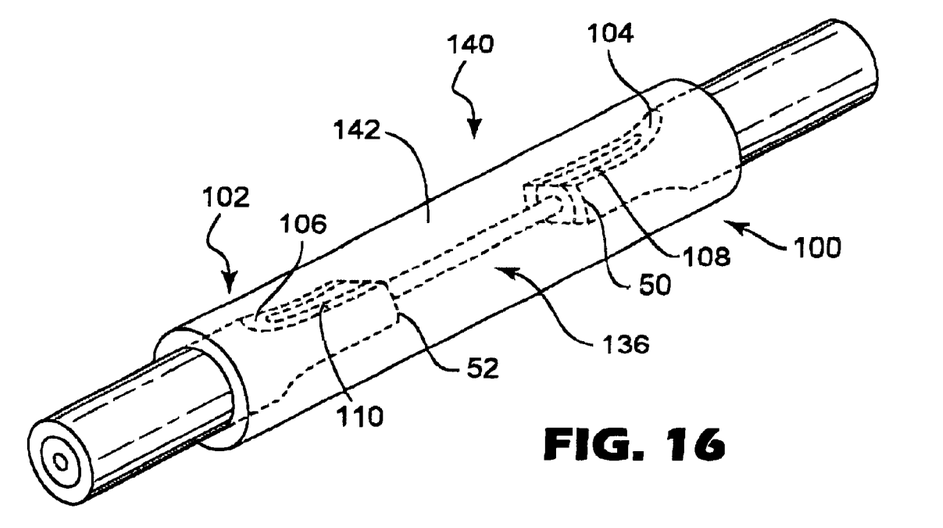
FIG. 16 is a perspective view of a recoated optical fiber according to the present invention.

FIG. 16 illustrates a recoated section 140 over a stripped optical fiber 126. A recoating material 142 extends over the stripped fiber and the transition regions 100, 102. Test results shown in Table 1 confirm that the recoated section 140 survives a greater number of thermal cycles than prior art stripped and recoated optical fibers of the type shown in FIG. 2. Thermal cycling produces temperature variations that can cause cracking and separation of coating material 142 in recoated sections 140 of optical fibers 30. In comparison with prior art recoated sections according to the present invention provide improved mechanical durability due to improved bonding of conventional, low modulus recoating resins to silicone-containing buffers. Shaped transition regions introduces less stress than prior art structures at the interface between a recoating composition and the original fiber coating.

The stripped optical fiber 136 was recoated along with the transition regions 100, 102 using a conventional split recoating mold available from Vytran Corporation as PTR-200 Series Fiber Recoater. A recoating mold of this type has two sections each with a nearly semicircular groove formed in its surface. The diameter of a groove is somewhat greater than the diameter of the coated fiber 30. For example a 450 μm diameter mold is used with a fiber having a diameter of 400 μm. A portion of coated optical fiber 30, including the stripped section 136, is aligned over the groove in one half of the split, recoating mold. Application of appropriate tension to the optical fiber prevents it from sagging into contact with the surface of the semicircular groove. After positioning the fiber 30 within the groove the second half of the mold is closed with its groove likewise aligned over the fiber 30. With correct adjustment, the axis of the fiber 30 lies along the axis of the elongate cylindrical channel formed by closing the mold. Recoating material, injected through an opening in the mold, surrounds the stripped section of fiber 136 and the transition regions 100, 102. Recoating materials include mixtures of acrylate, epoxy and urethane monomers, and oligomers and the like. Preferred compositions are commercially available from DSM Desotech, Elgin, Ill., and particularly DESOLITE 950-200.

A recoated optical fiber may be proof tested using Vytran Corporation's PTR-200 Series recoater equipped with a linear proof tester. Sample recoated fibers may be tested at 0.68 Gpa (100 kpsi) and 1.36 Gpa (200 kpsi).

Optical fibers were prepared for thermal cycling or proof testing using either Fujikura SM 332 or Fujikura Panda 400, both available from Fujikura Ltd. Designation as Panda 400 suggests that the coated optical fiber has a diameter of 400 μm including a bare fiber of about 125 μm overcoated with primary buffer to a diameter between 165 μm to 250 μm and a secondary buffer having a diameter of 250 μm to 400 μm.

Sample preparation included fiber stripping in which all SM 332 fibers were prepared for standard recoat using a combination of mechanical stripping and hot sulfuric acid stripping to provide a stripped optical fiber like that shown in FIG. 1. Panda 400 fibers were prepared according to the present invention to provide stripped optical fibers 136 including shaped transition regions 100, 102.

All of the stripped fibers were annealed at 300° C. for about 3 minutes to about 10 minutes before recoating with conventional recoating materials including DESOLITE 950-200, available from DSM Desotech, Elgin, Ill. A Vytran mold was used for recoating as previously described while proof testing performance was evaluated using a linear proof tester.

Thermal Cycling

Recoat samples with a modified transition region, prepared by straightedge shaving or abrasion, according to the present invention were compared with conventional recoated samples (see FIG. 2) during thermal cycling of recoated fibers containing Bragg gratings.

Bellcore GR-1221-CORE 6.2.7 test procedures were used between −40° C. and 80° C. Temperature varied at a rate of 1° C./minute with a dwell time of >15 minutes at the extremes of the stated temperature range and at room temperature. Thermal cycling over a temperature range of 120° C. requires that a recoated section of optical fiber undergo repeated expansion and contraction. Under the conditions specified a recoated sample, wrapped around a paper card 86 mm in diameter, may deteriorate by crack formation at the interface between the original optical fiber coating and the recoat material. Deterioration leads to failure when there is a visible separation between the original coating and the recoat material. Table 1 shows the marked increase in stability of recoated optical fibers that include a shaped transition region compared to recoated optical fibers that were stripped and recoated in a conventional way. Among test samples, based upon a standard fiber recoat structure (see FIG. 2), there was evidence of interfacial crack formation in fewer than twenty thermal cycles. In contrast, samples prepared to include shaped transition regions according to the present invention showed consistent superior performance. Transition regions 104, 106 prepared by shaving with sharpened straightedges, referred to herein as stepped transition regions, survived almost ten times the number of thermal cycles as standard fiber recoats. The use of abrasive materials provides a shaped optical fiber having contours that change more gradually than the stepped transition regions. Transition regions formed by abrasion have the curved wedge shape referred to in Table 1.

TABLE 1

Results of Optical Fiber Thermal Cycling (Abe results)

| Description | Number of samples passing 10 cycles | Number of samples passing 150 cycles |
|---|---|---|
| Standard recoat - no transition region | 3/12 | NA |
| Stepped transition region by dual blade shaping | 14/14 | 14/14 |
| Curved wedge transition region by abrasive shaping | 10/10 | 10/10 |

As required, details of the present invention are disclosed herein; however, it is to be understood that the disclosed embodiments are merely exemplary. Therefore, specific structural and functional details disclosed herein are not to be interpreted as limiting, but merely as a basis for the claims and as a representative basis for teaching one skilled in the art to variously employ the present invention.

What is claimed is:

1. A process for recoating a stripped optical fiber, said process comprising the steps of:

providing an optical fiber having a coating;

cutting said coating to provide a first cut boundary spaced from a second cut boundary to mark an internal section of said coating of said optical fiber, said internal section having opposing sides;

removing said coating from at least one of said opposing sides to provide a pared intervening layer and further to form a first transition region opposite a second transition region, each of said first transition region and said second transition region having a substantially wedge-shaped contour;

displacing said coating from said optical fiber to provide said stripped optical fiber including a bare section of optical fiber, said first transition region and said second transition region; and applying recoating material to said stripped optical fiber to cover said bare section of said optical fiber, said first transition region and said second transition region.

2. The process of claim 1, further including the step of writing a Bragg grating in said bare section of said optical fiber.

3. The process of claim 1, wherein said first transition region is contiguous with said first cut boundary and said second transition region is contiguous with said second cut boundary, each of said first transition region and said second transition region having a location outside of said internal section.

4. A process for recoating a stripped optical fiber, said process comprising the steps of:

providing an optical fiber having a coating;

cutting said coating to provide a first cut boundary spaced apart from a second cut boundary to mark an internal section of said coating of said optical fiber, said internal section having opposing sides;

removing said coating from at least one of said opposing sides to provide a pared intervening layer and further to form a first transition region opposite a second transition region, each of said first transition region and said second transition region having a substantially wedge-shaped contour that includes a shoulder portion and a flattened step portion adjoining said cut boundary;

displacing said coating from said optical fiber to provide said stripped optical fiber including a bare section of optical fiber, said first transition region and said second transition region; and applying recoating material to said stripped optical fiber to cover said bare section of said optical fiber, said first transition region and said second transition region.

5. The process of claim 1, wherein said removing said coating uses at least one sharpened straightedge.

6. The process of claim 1, wherein said removing said coating uses an abrasive.

7. The process of claim 1, wherein said coating includes a primary buffer and a secondary buffer.

8. The process of claim 7, wherein said pared intervening layer has a surface including said primary buffer and said secondary buffer.

9. The process of claim 1, wherein said displacing said coating includes treating said pared intervening layer with a solvent to weaken adhesion between said coating and said optical fiber between said first cut boundary and said second cut boundary.

10. The process of claim 9, wherein said displacing said coating includes dislodging said coating by rubbing against said coating with at least one resilient pad.

11. The process of claim 9, wherein said solvent is selected from the group consisting of acetone, methyl ethyl ketone, and methyl isopropyl ketone and the like.

12. The process of claim 1, wherein said applying recoating material uses a recoating mold.

* * * * *